(12) United States Patent
Austin et al.

(10) Patent No.: US 8,015,793 B2
(45) Date of Patent: Sep. 13, 2011

(54) FUEL HEATING VIA EXHAUST GAS EXTRACTION

(75) Inventors: Darren E. Austin, Orlando, FL (US); Stephen J. Young, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 583 days.

(21) Appl. No.: 12/175,665

(22) Filed: Jul. 18, 2008

(65) Prior Publication Data

US 2010/0031624 A1    Feb. 11, 2010

(51) Int. Cl.
*F02C 7/08* (2006.01)
*F02C 1/00* (2006.01)
(52) U.S. Cl. .......................... 60/39.52; 60/736; 60/772
(58) Field of Classification Search .............. 60/39.52, 60/39.5, 39.511, 736, 772
See application file for complete search history.

(56) References Cited

U.S. PATENT DOCUMENTS

| | | | |
|---|---|---|---|
| 5,845,481 A * | 12/1998 | Briesch et al. ............... | 60/776 |
| 7,007,487 B2 * | 3/2006 | Belokon et al. .............. | 60/777 |
| 7,434,402 B2 * | 10/2008 | Paprotna et al. ............. | 60/772 |
| 7,640,751 B2 * | 1/2010 | Putnam ......................... | 60/736 |
| 2001/0049934 A1 | 12/2001 | Ranasinghe et al. | |
| 2005/0166569 A1 | 8/2005 | Christensen et al. | |
| 2007/0178035 A1 | 8/2007 | White et al. | |
| 2007/0180768 A1 | 8/2007 | Briesch et al. | |

* cited by examiner

*Primary Examiner* — Ehud Gartenberg
*Assistant Examiner* — Arun Goyal

(57) ABSTRACT

A method and system for heating fuel for a gas turbine engine by using excess heat energy in the engine exhaust gas to heat the fuel and returning the cooled exhaust gas back to the engine exhaust gas stream upstream of an emissions sensor is disclosed. The method and system comprises providing a heat exchanger having an exhaust gas passage and a fuel passage, extracting high temperature exhaust gas from the engine exhaust gas stream and passing the high temperature exhaust gas through the exhaust gas passage. Fuel is passed through the fuel passage where excess heat energy in the high temperature exhaust gas is used to heat the fuel. The temperature of the heated fuel is controlled by controlling the flow of the high temperature exhaust gas through the exhaust gas passage.

20 Claims, 3 Drawing Sheets

FUEL HEATING VIA EXHAUST GAS EXTRACTION

FIELD OF THE INVENTION

The present invention relates to a method and system for heating fuel for a gas turbine engine, and more particularly, to a method and system for extracting engine exhaust gas from the exhaust gas stream to heat the fuel to improve the operating efficiency of the gas turbine engine.

BACKGROUND OF THE INVENTION

The use of gas turbine engines to drive generators to produce electricity has become increasingly attractive in recent years to meet the varying electrical demands of utility customers. Both simple cycle plants and combined cycle plants are in use. In a simple cycle plant, the engine exhaust gas is routed directly to the atmosphere through the exhaust stack. In a combined cycle plant, a heat recovery steam generator is provided in the engine exhaust gas stream to produce steam, which is used to produce additional electrical power in a steam turbine driven generator. It is desirable to increase the operating efficiency of such plants to meet increasingly competitive market demands.

The operating efficiency of a gas turbine engine driven generation plant may be increased by heating the fuel prior to combustion in the engine as less fuel energy is needed to raise the fuel temperature for combustion. Such plants produce considerable excess heat that may be used to increase the temperature of the fuel. For example, in a conventional combined cycle plant, steam produced in the heat recovery steam generator may be diverted from the steam turbine driven generator to a heat exchanger and used to heat the fuel.

U.S. Pat. No. 5,845,481 discloses a system where engine fuel is heated by passing it through a heat exchanger in a by-pass channel connected to the engine exhaust stack. The amount of exhaust gas passing through the by-pass channel is controlled by a damper, and the exhaust gas is vented to the atmosphere after passing through the by-pass channel. Unheated fuel may be mixed with the heated fuel to control the temperature of the heated fuel before combustion in the engine.

SUMMARY OF THE INVENTION

In accordance with a first aspect of the present invention, a method of heating a fuel for a gas turbine engine for effecting an improvement in the operating efficiency of the gas turbine is provided. The method may comprise providing a heat exchanger having an exhaust gas passage and a fuel passage, extracting a high temperature exhaust gas from a gas turbine engine exhaust gas stream and passing the high temperature exhaust gas through the heat exchanger exhaust gas passage. The method may further comprise passing a fuel though the heat exchanger fuel passage, heating the fuel in the heat exchanger fuel passage, producing a heated fuel and a cooled exhaust gas and returning the cooled exhaust gas to the exhaust gas stream upstream of an exhaust emissions sensor.

In accordance with another aspect of the present invention, a system for heating a fuel for a gas turbine engine for effecting an improvement in the operating efficiency of the gas turbine is provided. The system may comprise an exhaust gas to fuel heat exchanger having an exhaust gas passage including an exhaust gas inlet and an exhaust gas outlet and a fuel passage including a fuel inlet connected to a fuel supply and a fuel outlet connected to a gas turbine engine fuel inlet. The system may further comprise an exhaust gas inlet duct connected between a gas turbine engine exhaust gas stream and the exhaust gas inlet, an exhaust gas outlet duct connected between the exhaust gas outlet and the gas turbine engine exhaust gas stream. The exhaust gas inlet duct directs a flow of high temperature exhaust gas from the gas turbine engine exhaust gas stream and through the exhaust gas passage to transfer heat from the high temperature exhaust gas to the fuel in the heat exchanger producing a heated fuel and a cooled exhaust gas.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

The present invention provides a method and corresponding system for heating a fuel for a gas turbine engine by transferring excess heat from the engine exhaust gas to the fuel without the use of an intermediate fluid such as water. A portion of the high temperature engine exhaust gas is extracted from the exhaust gas stream and passed through an exhaust gas passage in an exhaust gas to fuel heat exchanger. An engine fuel is passed through a fuel passage in the heat exchanger where heat is transferred directly from the high temperature exhaust gas to the fuel. The exhaust gas is subsequently returned to the exhaust gas stream after passing through the heat exchanger. The heated fuel is combusted in the gas turbine engine, raising the operating efficiency of the engine because less fuel energy is needed to raise the temperature of the fuel for combustion. Embodiments of the invention are applicable to both simple-cycle and combined-cycle electrical power generation plants.

Figure 1:
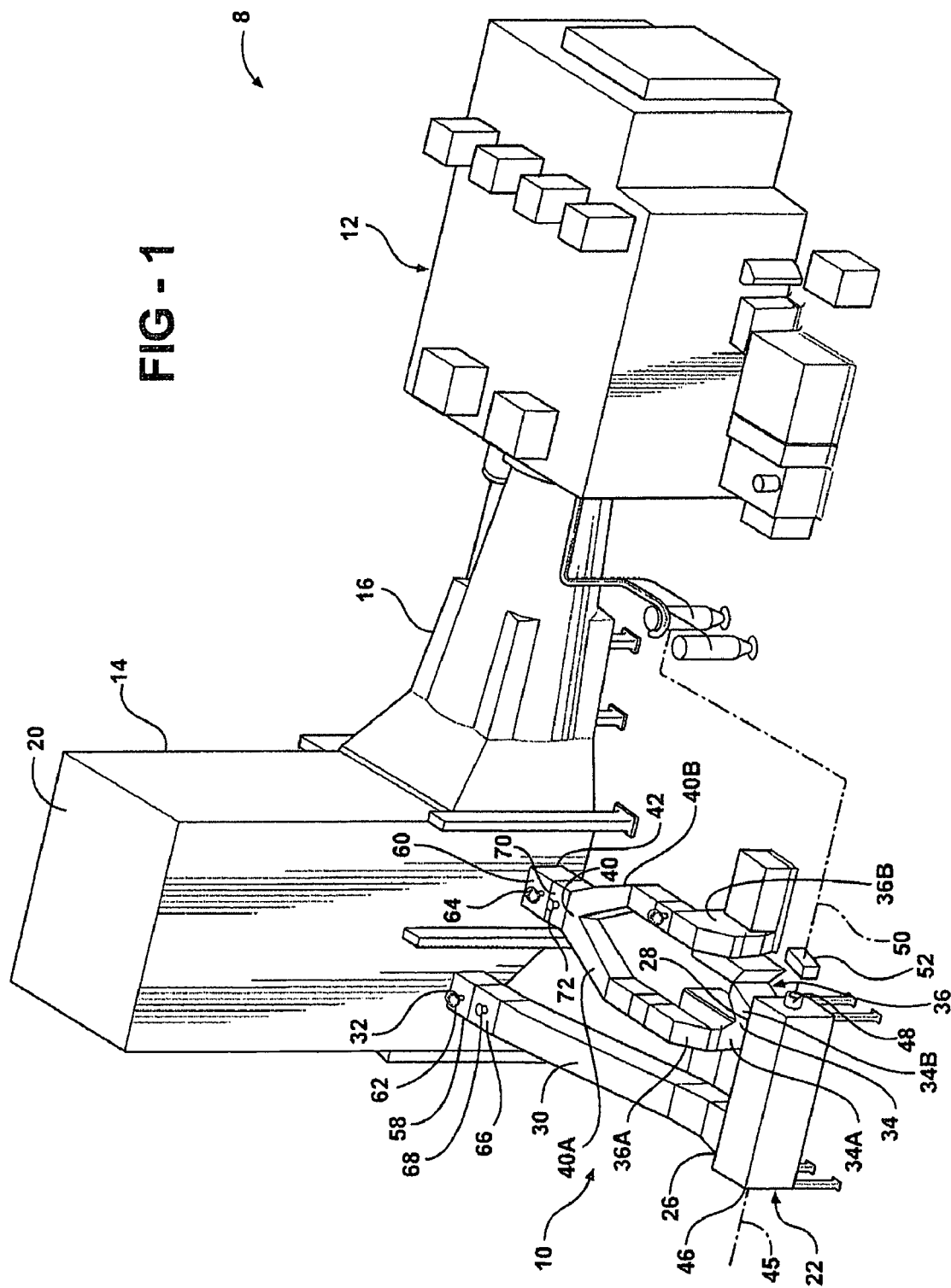
FIG. 1 is a perspective view of a fuel heating system for a gas turbine engine in a simple cycle electrical power generation plant in accordance with an embodiment of the present invention.
Figure 2:
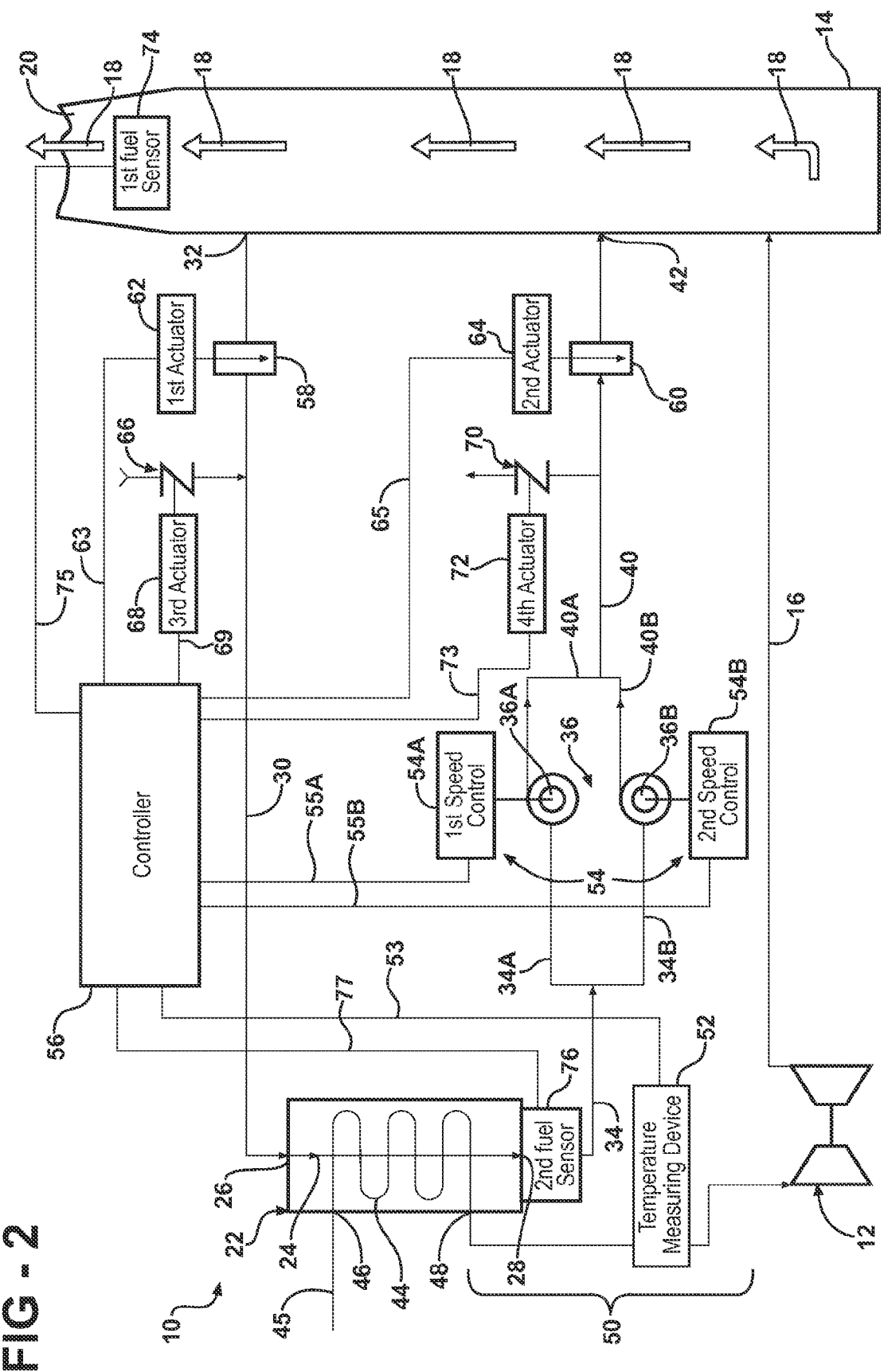
FIG. 2 is a schematic representation of the fuel heating system of FIG. 1.

Referring now to FIGS. 1 and 2, an exemplary fuel heating system 10 in accordance with an aspect of the present invention is illustrated in a simple-cycle power generation plant 8 where FIG. 1 shows a perspective view and FIG. 2 shows a schematic view. The system 10 provides heated fuel to a gas turbine engine 12, within which, the fuel, such as a natural gas or methane, is mixed with compressed air and combusted to produce a hot working gas, which is used to drive a turbine (not shown) where energy within the working gas is converted to a rotational mechanical motion causing a turbine shaft (not shown) to rotate. The turbine shaft (not shown) may be connected to a generator (not shown) for generation of electrical power. After passing through the turbine engine 12 the working gas, now referred to as an exhaust gas, is routed to an exhaust stack 14 by a connecting structure 16 connected between the engine 12 and the exhaust stack 14. The connecting structure 16, in combination with the exhaust stack 14, defines an exhaust gas flow referred to herein as an exhaust gas stream.

During normal operation of the plant, the exhaust gas exits the engine 12 at a high velocity and a high temperature, for example a temperature within a range of about 900 degrees F. to about 1200 degrees F. In a simple-cycle plant as illustrated in FIGS. 1 and 2, the high temperature exhaust gas, represented by the arrows 18 (shown only in FIG. 2), passes through the exhaust stack 14 and is ultimately discharged to a surrounding atmosphere through an exit opening 20 in the exhaust stack 14. The high temperature exhaust gas 18 contains a considerable amount of excess heat energy that is wasted when the high temperature exhaust gas 18 is discharged to the atmosphere. It is an object of the present invention to extract a portion of the excess heat energy from the high temperature exhaust gas 18 and use the excess heat energy to heat the fuel prior to combustion in the engine 12, thereby improving the operating efficiency of the engine 12 and the plant.

An exhaust gas to fuel heat exchanger 22 including an exhaust gas passage 24 (shown only in FIG. 2) having an exhaust gas inlet 26 and an exhaust gas outlet 28 is positioned proximate to the exhaust stack 14. A first end of an exhaust gas inlet duct 30 is connected to the exhaust stack 14 at an extraction location 32, and a second end of the exhaust gas inlet duct 30 is connected to the exhaust gas inlet 26 of the exhaust gas passage 24. The extraction location 32 is preferably located at a high pressure region of the exhaust gas stream. A portion of the high temperature exhaust gas 18 is thereby extracted from the exhaust gas stream at the extraction location 32 and routed to the exhaust gas passage 24 within the heat exchanger 22 by the exhaust gas inlet duct 30. For example, the portion of high temperature exhaust gas extracted from the exhaust gas stream at the extraction location 32 may be within a range of about 4% to about 7% of the total amount of high temperature exhaust gas flowing in the exhaust gas stream.

A first exhaust gas outlet duct 34 is connected to the exhaust gas outlet 28 of the exhaust gas passage 24. The exhaust gas outlet duct 34 connects the exhaust gas outlet 28 to an inlet of an induction blower 36. The induction blower 36 is configured to induce a flow of exhaust gas through the exhaust gas passage 24 as will be described in more detail herein. A second exhaust gas outlet duct 40 connects an outlet of the induction blower 36 to the exhaust stack 14 at a return location 42. The return location 42 is located in the exhaust gas stream upstream from the extraction location 32 and is preferably located at a low pressure region of the exhaust gas stream upstream of mixing baffles (not shown) in the exhaust stack 14. In this manner, the portion of the high temperature exhaust gas 18 that is extracted from the exhaust gas stream and routed to the exhaust gas passage 24 within the heat exchanger 22 is returned to the exhaust gas stack 14 at the return location 42 after passing through the exhaust gas passage 24.

Extracting the high temperature exhaust gas from the extraction location 32 located at a high pressure location in the exhaust gas stream and returning the cooled exhaust gas to the return location 42 located at a low pressure location in the exhaust gas stream provides a flow of high temperature exhaust gas through the exhaust gas passage 24 even when the induction blower 36 is not operating. Furthermore, returning the cooled exhaust gas to the exhaust stack 14 upstream of the mixing baffles allows the cooled exhaust gas to mix with the hot exhaust gas from the engine so as to minimize thermal shocks presented to components within the exhaust stack 14.

In the exemplary system 10 illustrated in FIGS. 1 and 2, the induction blower 36 comprises a first induction blower 36A and a second induction blower 36B. The first induction blower 36A and the second induction blower 36B may be configured to operate independently of one another and to provide a redundancy such that the system 10 may continue to operate while either the first induction blower 36A or the second induction blower 36B is serviced or replaced.

The first exhaust gas outlet duct 34 may branch into a left first exhaust gas outlet duct 34A connected to an inlet of the first induction blower 36A and a right first exhaust gas outlet duct 34B connected to an inlet of the second induction blower 36B. In like manner, the second exhaust gas outlet duct 40 may branch into a left second exhaust gas outlet duct 40A connected to an outlet of the first induction blower 36A and a right second exhaust gas outlet duct 40B connected to an outlet of the second induction blower 36B.

A fuel supply line 45 provides fuel to a fuel passage 44 (shown only in FIG. 2) having a fuel inlet 46 and a fuel outlet 48 is disposed within the heat exchanger 22 such that the fuel passing through the fuel passage 44 is in heat transfer proximity to the high temperature exhaust gas passing through the exhaust gas passage 24. The fuel outlet 48 is connected to a fuel system 50 that routes the fuel from the heat exchanger 22 to the gas turbine engine 12.

Fuel flows from the fuel supply line 45 connected to the fuel inlet 46, through the fuel passage 44 to the fuel outlet 48. In a plant 8 including a natural gas fueled engine 12, as shown in FIGS. 1 and 2, the fuel may be supplied from the fuel supply at a pressure of, for example, about 400 PSIG to about 600 PSIG, and may be at a temperature corresponding to an ambient temperature of the plant, for example, a temperature of approximately 60 degrees F. Heat is transferred from the high temperature exhaust gas passing through the exhaust gas passage 24 to the fuel passing through the fuel passage 44 thereby heating the fuel, producing a heated fuel and a cooled exhaust gas. The heated fuel is subsequently routed to the gas turbine engine 12 where it is mixed with compressed air and combusted thereby increasing the operating efficiency of the gas turbine engine 12 as previously discussed.

As heat is transferred from the high temperature exhaust gas to the fuel in the heat exchanger 22 the fuel may be heated to a temperature within a range of, for example, about 550 degrees F. to about 600 degrees F., and the high temperature exhaust gas may be cooled to a temperature within a range of, for example, about 450 degrees F. to about 650 degrees F. The cooled exhaust gas is returned to the exhaust gas stream at the return location 42 in the exhaust stack 14 via the first exhaust gas outlet duct 34, the induction blower 36 and the second exhaust gas outlet duct 40.

A temperature measuring device 52 is located within the fuel system 50 between the heat exchanger 22 and the gas turbine engine 12. The temperature measuring device 52 is configured to measure the temperature of the heated fuel after it has been heated in the heat exchanger 22 and to send a fuel temperature signal corresponding to the temperature of the heated fuel to a controller 56 (shown only in FIG. 2) via a connection 53 such that the temperature of the heated fuel may be controlled as will be described more fully herein.

A speed control device 54 (shown only in FIG. 2) is coupled to the induction blower 36. The speed control device 54 is configured to control the speed of the induction blower 36 such that a flow of the high temperature exhaust gas passing through the exhaust gas passage 24 corresponds to a speed of the induction blower 36. In this manner, the flow of high temperature exhaust gas flowing through the exhaust gas passage 24 may be increased by increasing the speed of the induction blower 36 and reduced by decreasing the speed of the induction blower 36.

Increasing the speed of the induction blower 36 and the corresponding flow of high temperature exhaust gas flowing through the exhaust gas passage 24 generally results in a corresponding increase in the temperature of the fuel passing through the fuel passage 44. Conversely, decreasing the speed of the induction blower 36 and the corresponding flow of high temperature exhaust gas flowing through the exhaust gas passage 24 generally results in a corresponding smaller increase in the temperature of the fuel passing through the fuel passage 44. In this manner, the temperature of the heated fuel exiting the fuel passage 44 from the fuel outlet 48 generally correlates to the speed of the induction blower 36, and the temperature of the heated fuel may be controlled by controlling the speed of the induction blower 36.

As illustrated in FIG. 2, the speed control device 54 comprises a first speed control device 54A connected to the first induction blower 36A and a second speed control device 54B connected to the second induction blower 36B. The first speed control device 54A is configured to operate the first induction blower 36A at a speed corresponding to a signal received from a controller 56 via a connection 55A as will be described in more detail herein. Similarly, the second speed control device 54B is configured to operate the second induction blower 36B at a speed corresponding to a similar signal received from the controller via a connection 55B.

The first speed control device 54A and the second speed control device 54B are configured to operate independently of one another such that the system 10 may be operated using either the first speed control device 54A and first induction blower 36A or the second speed control device 54B and second induction blower 36B. Alternatively, the system 10 may be operated using the first speed control device 54A and the first induction blower 36A simultaneously with the second speed control device 54B and the second induction blower 36B. In this manner, the system 10 may continue to operate while the first speed control device 54A and/or the first induction blower 36A is serviced or replaced or the second speed control device 54B and/or the second induction blower 36B is serviced or replaced.

The controller 56 is configured to control the temperature of the heated fuel. The controller 56 may comprise, for example, a microprocessor, a microcomputer, an industrial controller, a discrete logic circuit or other suitable controlling device. The controller 56 is connected to the temperature measuring device 52 via the connection 53 and receives a fuel temperature signal therefrom corresponding to the temperature of the heated fuel sensed by the temperature measuring device 52. The controller 56 is configured to control the speed of the induction blower 36 based at least upon the fuel temperature signal received from the fuel measuring device 52. For example, the controller 56 may receive a temperature setpoint signal from a remote device (not shown) corresponding to a desired fuel temperature setpoint. The controller 56 may compare the temperature setpoint signal to the fuel temperature signal received from the temperature measuring device 52 and send a signal to the speed control device 54 that corresponds to a desired speed of the induction blower 36 such that the temperature of the heated fuel sensed by the temperature measuring device 52 approximates the temperature setpoint signal as previously discussed.

A first isolation damper 58 is positioned in the exhaust gas inlet duct 30 between the extraction location 32 in the exhaust stack 14 and the exhaust gas inlet 26 of the exhaust gas passage 24 and proximate to the exhaust stack 14. The first isolation damper 58 is configured to allow high temperature exhaust gas to flow from the exhaust stack 14 through the exhaust gas inlet duct 30 and into the exhaust gas inlet 26 of the exhaust gas passage 24 when in an open position and to prevent the flow of high temperature exhaust gas from the exhaust stack 14 through the exhaust gas inlet duct 30 and into the exhaust gas inlet 26 of the exhaust gas passage 24 when in a closed position.

A second isolation damper 60 is positioned in the second exhaust gas outlet duct 40 between the induction blower 36 and the return location 42 of the exhaust stack 14 and proximate to the exhaust stack 14. The second isolation damper 60 is configured to allow cooled exhaust gas to flow from the induction blower 36 through the second exhaust gas outlet duct 40 and into the exhaust stack 14 at the return location 42 when in an open position and to prevent the flow of cooled exhaust gas from the induction blower 36 through the second exhaust gas outlet duct 40 and into the exhaust stack 14 when in a closed position. The first and second isolation dampers 58 and 60 may comprise first and second guillotine valves, and may be configured to rapidly transition from the open position to the closed position so as to quickly stop a flow of exhaust gas through the exhaust gas inlet duct 30 and exhaust gas outlet duct 40, respectively.

A first actuator 62 is coupled to the first isolation damper 58 and is configured to transition the first isolation damper 58 between the open and closed positions. Similarly, a second actuator 64 is coupled to the second isolation damper 60 and is configured to transition the second isolation damper 60 between the open and closed positions. The first and second actuators 62 and 64 are connected to the controller 56 and receive signals therefrom via connections 63 and 65 corresponding to desired open and closed positions of the first isolation damper 58 and second isolation damper 60, respectively.

A purge air inlet valve 66 is positioned in the exhaust gas inlet duct 30 between the first isolation damper 58 and the exhaust gas inlet 26 of the exhaust gas passage 22 proximate to the first isolation damper 58. The purge air inlet valve 66 is configured to allow ambient air to enter the exhaust gas inlet duct 30 from the surrounding atmosphere when in an open position and to prevent ambient air from entering the exhaust gas inlet duct 30 or high temperature exhaust gas from escaping from the exhaust gas inlet duct 30 to the surrounding atmosphere when in a closed position. A third actuator 68 is connected to the purge air inlet valve 66 and is configured to transition the purge air inlet valve 66 between the closed and open positions. The third actuator 68 is connected to the controller 56 via a connection 69 and causes the purge air inlet valve 66 to transition to the open or closed position upon receiving a corresponding signal from the controller 56.

A purge air outlet valve 70 is positioned in the second exhaust gas outlet duct 40 between the induction blower 36 and the second isolation damper 60 proximate to the second isolation damper 60. The purge air outlet valve 70 is configured to allow gasses, including purge air and/or cooled exhaust gas, to exit the second exhaust gas outlet duct 40 to the surrounding atmosphere when in an open position and to prevent gasses from exiting the second exhaust gas outlet duct 40 when in a closed position. A fourth actuator 72 is coupled to the purge air outlet valve 70 and is configured to transition the purge air outlet valve 70 between the closed and open positions. The fourth actuator 72 is coupled to the controller 56 via a connection 73 and causes the purge air outlet valve 70 to transition to the open or closed position upon receiving a corresponding signal from the controller 56.

A first fuel sensor 74 (shown only in FIG. 2) is located in the exhaust gas stream downstream from the return location 42 in the exhaust stack 14. The first fuel sensor 74 is configured to measure a level of unburned fuel in the high temperature exhaust gas 18 in the exhaust gas stream. The first fuel sensor 74 is connected to the controller 56 via a connection 75 and sends a signal corresponding to the level of unburned fuel in the high temperature exhaust gas 18 to the controller 56.

The first fuel sensor 74 may be an existing exhaust emissions sensor within the exhaust gas stream provided to measure emissions of unburned fuel into the atmosphere in order to comply with environmental regulations. Locating the return location 42 upstream of an existing exhaust emissions sensor allows the existing sensor to be used to determine an operating baseline value of unburned fuel in the exhaust gas stream in order to verify proper operation of a fuel leakage detection system as will be described in more detail herein. Alternatively, a first fuel sensor 74 distinct from an existing exhaust emissions sensor may be provided in the exhaust gas stream downstream from the return location 42 in the exhaust stack 14.

A second fuel sensor 76 (shown only in FIG. 2) is positioned within or near the heat exchanger 22 proximate to the exhaust gas outlet 28 of the exhaust gas passage 24. The second fuel sensor 76 is configured to measure a level of unburned fuel in the cooled exhaust gas exiting from the exhaust gas outlet 28 of the exhaust gas passage 24. The second fuel sensor 76 is connected to the controller 56 via a connection 77 and sends a signal corresponding to the level of unburned fuel in the cooled exhaust gas exiting from the exhaust gas outlet 28 to the controller 56.

Because the combustion of fuel within the gas turbine engine 12 is not completely efficient, the high temperature exhaust gas 18 exiting the gas turbine engine 12 and passing through the exhaust stack 14 contains an amount of unburned fuel corresponding to the efficiency of the combustion process. This amount of unburned fuel may vary within a range of about 0.01 percent to about 1 percent depending upon operating conditions.

The controller 56 iteratively monitors the signal from the second fuel sensor 76 corresponding to the level of unburned fuel in the cooled exhaust gas exiting the heat exchanger 22 exhaust gas passage 24 and compares it to a first predetermined threshold value. If the level of unburned fuel in the cooled exhaust gas exiting the heat exchanger 22 exceeds the first predetermined threshold value, the controller 56 determines that fuel is leaking from the fuel passage 44 to the exhaust gas passage 24 in the heat exchanger.

The controller 56 also monitors the signal from the first fuel sensor 74 corresponding to the level of unburned fuel in the exhaust gas stream and establishes an operating baseline of unburned fuel in the exhaust gas stream. The controller 56 iteratively compares the level of unburned fuel in the cooled exhaust gas to the operating baseline of unburned fuel in the exhaust gas stream in order to verify proper operation of the first fuel sensor 74 and the second fuel sensor 76. If the controller detects that the level of unburned fuel in the cooled exhaust gas as measured by the second fuel sensor 76 differs from the operating baseline of unburned fuel in the exhaust gas stream by a second predetermined threshold value, the controller identifies a malfunction of the first fuel sensor 74 or the second fuel sensor 76. The first fuel sensor 74 and the second fuel sensor 76, in conjunction with the controller 56, is collectively referred to herein as a fuel leakage detector.

Upon determining that a leakage of fuel from the fuel passage 44 to the exhaust gas passage 24 is present, the controller 56 causes the exhaust gas passage 24 to be purged of exhaust gas and fuel in a purge operation. Specifically, the controller 56 sends a signal to the first actuator 62 causing the first actuator 62 to transition the first isolation damper 58 from the open position to the closed position preventing high temperature exhaust gas from entering the exhaust gas inlet duct 30 from the exhaust stack 14. Similarly, the controller 56 sends a signal to the second actuator 64 causing the second actuator 64 to transition the second isolation damper 60 from the open position to the closed position preventing cooled exhaust gas from entering the exhaust stack 14 from the second exhaust gas outlet duct 40.

The controller 56 also sends a signal to the third actuator 68 causing the third actuator 68 to transition the purge air inlet valve 66 from the closed position to the open position allowing ambient air to be drawn into the exhaust gas inlet duct 30 from the surrounding atmosphere through the purge air inlet valve 66 by the induction blower 36. The ambient air that is drawn into the exhaust gas inlet duct 30 through the purge air inlet valve 66 is referred to herein as purge air.

The controller 56 also sends a signal to the fourth actuator 72 causing the fourth actuator 72 to transition the purge air outlet valve 70 from the closed position to the open position allowing gasses, including cooled exhaust gas along with leakage fuel, that has entered the exhaust gas passage 24 from the fuel passage 44 to be expelled to the surrounding atmosphere by the purge air that has been drawn into the exhaust gas inlet duct 30 through the purge air inlet valve 66.

During the purge operation, the induction blower 36 may operate at a maximum speed such that a substantial flow of purge air is induced to flow into the exhaust gas inlet duct 30 through the purge air inlet valve 66 and through the exhaust gas passage 24 in the heat exchanger 22. As the purge air flows through the exhaust gas passage 24, the cooled exhaust gas within the exhaust gas passage 24 and the exhaust gas outlet duct 34 and fuel that has leaked from the fuel passage 44 into the exhaust gas passage 24 is removed from the exhaust gas passage 24 and subsequently expelled to the surrounding atmosphere through the purge air outlet valve 70.

During the purge operation, the flow of fuel from the fuel supply line 45 may be prevented from entering the fuel passage 44 through the fuel inlet 46 and bypassed around the heat exchanger 22 directly to the fuel system 50 of the gas turbine engine 12 by appropriate bypass valving (not shown). In this manner, unheated fuel may be supplied to the gas turbine engine 12 allowing the gas turbine engine 12 to continue to operate while the heat exchanger 22 exhaust gas passage 24 is purged of leaked fuel from the fuel passage 44 and/or system components are serviced or replaced.

The controller 56 is configured to iteratively monitor the second fuel sensor 76 and to rapidly purge the exhaust gas passage 24 within the heat exchanger 22 of high temperature exhaust gas and leakage fuel as previously described upon detecting a leakage of fuel from the fuel passage 44 into the exhaust gas passage 24. For example, the controller 56 may be configured to monitor the second fuel sensor 76 numerous times each second, e.g., 5 times each second, during operation of the system 10 in order to promptly detect any leakage of fuel from the fuel passage 44 into the exhaust gas passage 24 In this manner, the possibility of leaked fuel igniting upon contact with the hot exhaust gas in the exhaust gas passage 24, the first or second exhaust gas outlet ducts 34 and 40, the induction blower 36 or the exhaust stack 14 is minimized.

The controller 56 may be further configured to purge the exhaust gas passage 24 with purge air prior to operation of the system 10 after a period of inoperation. In this manner, any fuel that may have leaked from the fuel passage 44 into the exhaust gas passage 24, the exhaust gas inlet duct 30, the first or second exhaust gas outlet ducts 34 and 40 or the induction blower 36 during the period of inoperation may be purged prior to introduction of high temperature exhaust gas into the system so as to prevent ignition of leakage fuel in these components as previously described.

Figure 3:
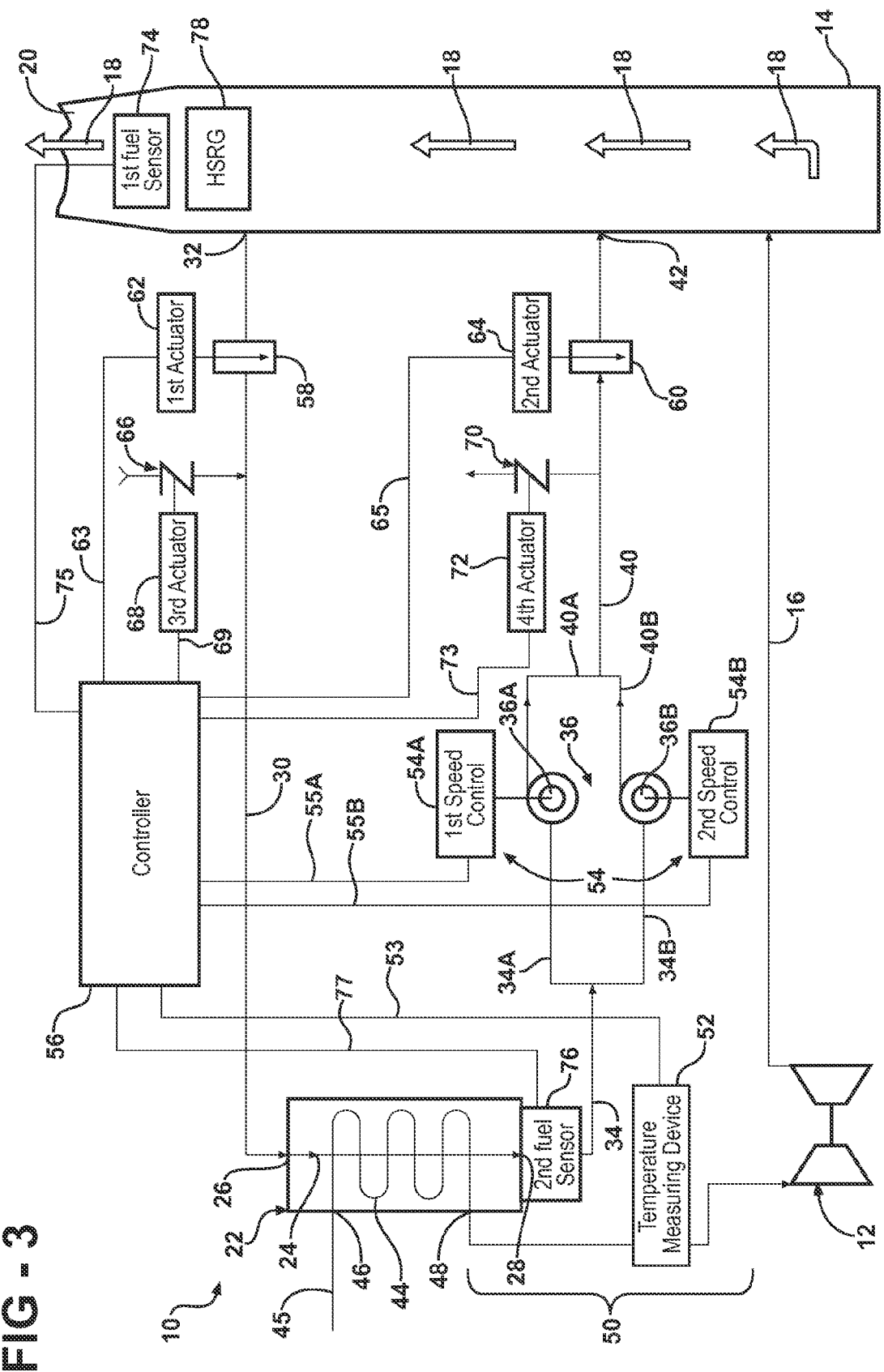
FIG. 3 is a schematic representation of the fuel heating system shown in FIG. 2 used in a combined cycle electrical power generation plant in accordance with another embodiment of the present invention.

Referring now to FIG. 3, a fuel heating system 100 in accordance with other aspects of the present invention is illustrated diagrammatically, where like elements are referred to by like reference numerals. The system 100 is similar to the system 10 illustrated in FIGS. 1 and 2 except as described below.

FIG. 3 illustrates a fuel heating system 100 used in a combined-cycle electrical power generation plant. A heat recovery steam generator 78 (shown only in FIG. 3), hereinafter HSRG, is positioned in the exhaust gas stream. The HSRG 78 is used to recover excess heat from the engine exhaust gas to generate steam for use in a steam turbine (not shown) to generate additional electrical power, thereby increasing the operating efficiency of the plant. Similar to the system 10 previously described with reference to FIGS. 1 and 2, the system 100 utilizes a portion of the high temperature exhaust gas to heat the fuel prior to combustion in the gas turbine engine 12 without requiring the use of an intermediate fluid such as water, thereby further increasing the operating efficiency of the plant.

The HSRG 78 may be positioned in a suitable location in the exhaust gas stream as determined by design parameters of the plant. As heat is removed from the high temperature exhaust gas in the HSRG, the temperature of the exhaust gas is reduced, for example to a temperature of about 450 degrees F. For this reason, the extraction location 42 is positioned upstream of the HSRG in the exhaust stack 14 in order to extract high temperature exhaust gas containing sufficient heat energy to heat the fuel to the desired temperature in the heat exchanger 22.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of heating a fuel for a gas turbine engine, the method comprising:
providing a gas turbine engine connected to an exhaust gas stack to the atmosphere;
providing an exhaust gas passage including an exhaust gas inlet duct connecting said stack to an exhaust gas to fuel heat exchanger, and an exhaust gas outlet duct connecting said heat exchanger to said stack, said exhaust passage providing a flow of high temperature exhaust gas from said stack to said heat exchanger and back to said stack;
closing a first damper at said exhaust gas inlet duct;
closing a second damper at said exhaust gas outlet duct; and
providing a flow of atmospheric air into said exhaust gas passage at said exhaust gas inlet duct and providing a flow of gas out of said exhaust gas passage at said exhaust gas outlet duct when said first and second dampers are closed.

2. The method of claim 1, including the step of controlling a temperature of fuel heated in said heat exchanger comprising controlling a flow rate of said high temperature exhaust gas through said exhaust gas passage such that said flow rate of said high temperature exhaust gas is increased or decreased to produce an increase or decrease in the temperature of said fuel.

3. The method of claim 1, wherein;
said high temperature exhaust gas is extracted from a high pressure region of an exhaust gas stream in said stack; and
cooled exhaust gas from said heat exchanger is returned to a low pressure region of said exhaust gas stream upstream from an exhaust emissions sensor.

4. The method of claim 3, wherein said high pressure region of said exhaust gas stream is downstream of said low pressure region of said exhaust gas stream.

5. The method of claim 1, further comprising:
detecting a leakage of fuel from a fuel passage in said heat exchanger to said exhaust gas passage in said heat exchanger; and
introducing said air to purge said heat exchanger when said leakage of said fuel from said fuel passage to said exhaust gas passage in said heat exchanger is detected.

6. The method of claim 5, wherein said introducing air to purge said heat exchanger comprises:
preventing said high temperature exhaust gas from entering said exhaust gas passage in said heat exchanger;
preventing cooled exhaust gas from said heat exchanger from entering an exhaust gas stream in said stack;
preventing said fuel from entering said fuel passage in said heat exchanger; and
removing said fuel from said exhaust gas passage.

7. The method of claim 5, wherein said detecting a leakage of said fuel from said fuel passage in said heat exchanger to said exhaust gas passage in said heat exchanger comprises:
measuring a level of said fuel in cooled exhaust gas from said heat exchanger;
comparing said level of said fuel in said cooled exhaust gas to a first predetermined threshold value; and
identifying a leakage of said fuel from said fuel passage to said exhaust gas passage when said level of said fuel in said cooled exhaust gas exceeds said first predetermined threshold value.

8. The method of claim 1, further comprising providing said flow of atmospheric air to said exhaust gas passage prior to passing said high temperature exhaust gas through said heat exchanger.

9. The method of claim 1, wherein a fuel heated in said heat exchanger comprises a natural gas fuel heated to a temperature within a range of about 550 degrees F. to about 600 degrees F.

10. A gas turbine system comprising:
a gas turbine engine;
said gas turbine engine connected to an exhaust gas stack to the atmosphere;
an exhaust gas inlet duct connecting said stack to an exhaust gas to fuel heat exchanger;
an exhaust gas outlet duct connecting said heat exchanger to said stack;
an inlet atmospheric air purge line connected to said exhaust gas inlet duct;
an outlet atmospheric air purge line connected to said exhaust gas outlet duct;
a first damper connected to said exhaust gas inlet duct between said inlet atmospheric air purge line and said stack; and a second damper connected to said exhaust gas outlet duct between said outlet atmospheric air purge line and said stack.

11. The system of claim 10, including an induction blower configured to induce a flow of high temperature exhaust gas from said stack through said exhaust gas passage.

12. The system of claim 11, further comprising:
a temperature measuring device configured to measure a temperature of fuel heated in said heat exchanger;
a speed control device configured to control a speed of said induction blower such that said flow of said high temperature exhaust gas through an exhaust gas passage including said exhaust gas inlet duct and said exhaust gas outlet duct corresponds to said speed of said induction blower; and
a controller connected to said temperature measuring device and said speed control device, said controller configured to control said speed of said induction blower based at least upon a signal from said temperature measuring device such that a temperature of said fuel heated in said heat exchanger generally correlates to said speed of said induction blower.

13. The system of claim 10, further comprising:
a fuel leakage detector configured to detect a leakage of fuel from a fuel passage in said heat exchanger into an exhaust gas passage through said heat exchanger;
a first actuator for effecting movement of said first damper between open and closed positions;
a second actuator for effecting movement of said second damper between open and closed positions; and
a controller coupled to said fuel leakage detector, said first actuator and said second actuator, said controller configured to monitor said fuel leakage detector and to cause said first and second actuators to close said first and second dampers, respectively, when said leakage of said fuel is detected from said fuel passage into said exhaust gas passage.

14. The system of claim 13, further comprising:
a purge air inlet valve located in said inlet atmospheric air purge line including a third actuator configured to transition said purge air inlet valve between an open position, where purge air is allowed to enter said exhaust gas inlet duct, and a closed position, where purge air is prevented from entering said exhaust gas inlet duct through said purge air inlet valve; and
a purge air outlet valve located in said inlet atmospheric air purge line including a fourth actuator configured to transition said purge air outlet valve between an open position, where gases passing through said exhaust gas passage are allowed to discharge from said exhaust gas outlet duct, and a closed position, where gases passing through said exhaust gas passage are prevented from exiting said exhaust gas outlet duct through said purge air outlet valve.

15. The system of claim 14, wherein said controller is connected to said third and fourth actuators and is configured to purge said exhaust gas passage prior to passing said high temperature exhaust gas through said exhaust gas passage.

16. The system of claim 13, wherein said fuel leakage detector comprises:
a first fuel sensor located in a gas turbine engine exhaust gas stream passing through said stack, said first fuel sensor configured to measure a level of unburned fuel in said exhaust gas stream;
a second fuel sensor located in said exhaust gas passage proximate to said exhaust gas outlet of said heat exchanger, said second fuel sensor configured to measure a level of unburned fuel in cooled exhaust gas exiting said heat exchanger; and
wherein said controller is configured to monitor said second fuel sensor and to detect a leakage of said fuel from said fuel passage to said exhaust gas passage and actuate said first and second actuators to close said first and second dampers when said level of unburned fuel in said cooled exhaust gas exceeds a first predetermined threshold value.

17. The system of claim 16, wherein said controller is further configured to monitor said first fuel sensor and to identify a malfunction of said first fuel sensor or said second fuel sensor if said level of unburned fuel in said cooled exhaust gas differs from said level of unburned fuel in said exhaust gas stream by a second predetermined threshold value.

18. The system of claim 10, wherein:
said exhaust gas inlet duct connects to a high pressure region of a gas turbine engine exhaust gas stream passing through said stack; and
said exhaust gas outlet duct connects to a low pressure region of said gas turbine exhaust gas stream.

19. The system of claim 18, wherein said high pressure region is downstream of said low pressure region.

20. The system of claim 10, wherein said system is configured to operate in a simple cycle electrical power generation plant.

* * * * *